(12) United States Patent
Sheftel et al.

(10) Patent No.: US 11,004,207 B2
(45) Date of Patent: May 11, 2021

(54) MULTI-MODAL DATA FUSION FOR SCENE SEGMENTATION

(71) Applicant: Blueprint Reality Inc., Vancouver (CA)

(72) Inventors: Benjamin James Sheftel, Vancouver (CA); Tryon Williams, West Vancouver (CA)

( * ) Notice: Subject to any disclaimer, the term of this patent is extended or adjusted under 35 U.S.C. 154(b) by 138 days.

(21) Appl. No.: 15/995,536

(22) Filed: Jun. 1, 2018

(65) Prior Publication Data

US 2019/0172212 A1 Jun. 6, 2019

Related U.S. Application Data

(60) Provisional application No. 62/595,559, filed on Dec. 6, 2017.

(51) Int. Cl.
*G06K 9/34* (2006.01)
*G06T 7/194* (2017.01)
*G06T 7/136* (2017.01)
*G06T 7/155* (2017.01)
*G06T 7/143* (2017.01)
*H04N 9/75* (2006.01)

(52) U.S. Cl.
CPC ............. *G06T 7/194* (2017.01); *G06T 7/136* (2017.01); *G06T 7/143* (2017.01); *G06T 7/155* (2017.01); *H04N 9/75* (2013.01); *G06T 2207/20044* (2013.01)

(58) Field of Classification Search
None
See application file for complete search history.

(56) References Cited

U.S. PATENT DOCUMENTS

| | | | | |
|---|---|---|---|---|
| 7,317,830 | B1 * | 1/2008 | Gordon | G06K 9/38 382/173 |
| 2011/0026812 | A1 * | 2/2011 | Ikeda | G06K 9/38 382/159 |
| 2011/0229024 | A1 * | 9/2011 | El-Maraghi | G06T 7/155 382/162 |
| 2014/0307056 | A1 * | 10/2014 | Collet Romea | G06K 9/38 348/47 |
| 2018/0189955 | A1 * | 7/2018 | Moshe | G06K 9/6256 |
| 2018/0204057 | A1 * | 7/2018 | Yu | G06T 7/174 |
| 2018/0218504 | A1 * | 8/2018 | Makino | G06T 7/194 |
| 2019/0164313 | A1 * | 5/2019 | Ma | G06K 9/6267 |

* cited by examiner

*Primary Examiner* — Sean M Conner
(74) *Attorney, Agent, or Firm* — Damien G. Loveland

(57) ABSTRACT

Multiple detection techniques are used to determine whether the individual pixels in an image are background or foreground. The outputs from the multiple techniques are combined according to a confidence metric associated with each technique, which may vary from pixel to pixel. The resulting blended value for each pixel is compared with a threshold to determine whether the pixel is foreground or background.

16 Claims, 4 Drawing Sheets

MULTI-MODAL DATA FUSION FOR SCENE SEGMENTATION

CROSS-REFERENCE TO RELATED APPLICATIONS

This application claims the benefit of U.S. provisional patent application Ser. No. 62/595,559, filed on Dec. 6, 2017, which is incorporated by reference herein in its entirety.

TECHNICAL FIELD

This application relates to a method and system for segmenting a scene into background and foreground components. In particular, it relates to the fusion of different techniques to determine the segmentation on an individual pixel level.

BACKGROUND

Background subtraction is a technique used in the fields of image processing and computer vision, wherein an image's foreground is extracted from a video sequence for further processing. This technique is sometimes used, for example, to detect a moving subject using a static camera. The detection of the moving subject is the result of a comparison between the current frame and a reference frame. The main drawback with this technique is when a background object is moving.

Chromakeying is used both in real time and in post-processed video production for the removal of a greenscreen background from a moving subject. By excluding or reducing the display of the pixels that closely match the key color, the moving subject can be isolated from the background set and rendered onto other graphics. However, the drawbacks of this technique are limitations in options for the colors of both the subject and background, and gradual or sudden illumination changes.

Image segmentation or scene segmentation is used to create a partition of an image into several coherent parts. Every part, or even every pixel is classified and labelled into one of the pre-determined classes of foreground or background. The problems associated with this technique are contour detection, bottom-up grouping and the inefficiency of labeling each pixel in real time.

The technique of 3D reconstruction captures the shape of real subjects and generates a computer model of the three-dimensional appearance of the subject from a set of two-dimensional images. The limitations of this method are related to the ability to run the reconstruction in real time and the difficulty of obtaining a high-quality representation.

Computer vision methods are used to process, analyse and understand highly dimensional data obtained from the real world in order to produce numerical or symbolic information.

This background information is provided to reveal information believed by the applicant to be of possible relevance to the present invention. No admission is necessarily intended, nor should be construed, that any of the preceding information constitutes prior art against the present invention.

SUMMARY OF INVENTION

Multiple sets of data inputs describing a physical scene are used to discriminate background and foreground segments of the scene on a granular or per-pixel level. The method of determination used may be one or more of an optical comparison, a depth comparison, a subject approximation and computer vision.

For each pixel in the image, determinations from each of the data inputs are combined in proportion to a confidence level of each detection technique. The resulting blended value for the segmentation is compared to a threshold to finally determine whether the pixel is foreground or background.

A subject may be videoed with any background and any lighting, and without any constraint on clothing, and the resulting video can be segmented into foreground and background, which is removed, in real time. One possible benefit of the invention is that a subject may be virtually holoported from anywhere, irrespective of the background and lighting, in real-time, and superimposed on another background on a remote display screen. Another possible benefit is that the error rate of the segmentation process is estimated to be about a factor of ten lower than at least one of the individual prior art methods, in terms of the number of pixels that are incorrectly discriminated. This invention provides one or more of the benefits described above, or improves upon one or more of the drawbacks associated with the prior art.

Disclosed herein is a method for segmenting an image into foreground and background comprising the steps of: capturing an image of a scene; for each of multiple detection techniques, processing the image to preliminarily determine that each pixel in the image is either background or foreground; for each pixel, combining the preliminary determinations in proportion to a confidence level attributed to each detection technique to yield a blended value for each pixel, wherein the blended value lies in a range varying from a value that represents background to a value that represents foreground; defining a threshold value that lies in the range; and for each pixel, determining that the pixel is foreground or background depending on which side of the threshold the blended value lies.

Also disclosed herein is a system for segmenting an image into foreground and background comprising a camera configured to capture an image of a scene and a processor connected to the camera. The processor is configured to: receive the image from the camera; for each of multiple detection techniques, process the image to preliminarily determine that each pixel in the image is either background or foreground; for each pixel, combine the preliminary determinations in proportion to a confidence level attributed to each detection technique to yield a blended value for each pixel, wherein the blended value lies in a range varying from a value that represents background to a value that represents foreground; define a threshold value that lies in the range; and for each pixel, determine that the pixel is foreground or background depending on which side of the threshold the blended value lies.

BRIEF DESCRIPTION OF DRAWINGS

The following drawings illustrate embodiments of the invention, which should not be construed as restricting the scope of the invention in any way.

DESCRIPTION

A. Glossary

The term "chroma keying" refers to keying specifically for an algorithm that uses color to identify areas of images. If may, for example, refer to the removal of a background from a video that has a subject in the foreground. A color range in the video is made transparent, so that when the video is incorporated in/overlaid on another scene or video, the subject appears to be in the other scene or video.

The term "HSB" (hue, saturation, brightness) refers to a set of three numerical values that represent color in cylindrical coordinates.

The term "processor" is used to refer to any electronic circuit or group of circuits that perform calculations, and may include, for example, single or multicore processors, multiple processors, graphics processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

The term "RGB" (red, green, blue) refers to a set of three numerical values, usually in the range 0-255, corresponding respectively to the amount of red, green and blue light output by a pixel in an electronic display.

The term "segmentation" means the separation of an image into component portions, specifically a background portion and a foreground portion. A given portion may include non-contiguous sub-portions.

B. Overview

Figure 1:
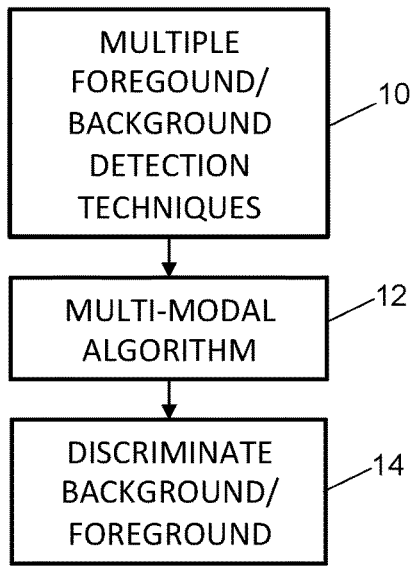
FIG. 1 is a flowchart of the main steps of a process according to an embodiment of the present invention.
Figure 2:
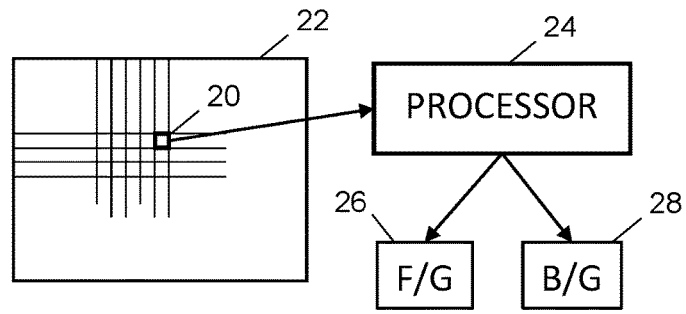
FIG. 2 is a schematic representation of the classification of a pixel into background or foreground, according to an embodiment of the present invention.

Referring to FIG. 1, the main steps of the process are shown. In step 10, multiple different detection techniques for distinguishing between foreground and background are employed. For example, the detection techniques used include one or more of skeletal pose detection, chromakeying, static subtraction and static depth comparison. In step 12, a multi-modal algorithm is used to combine the results of the different detection techniques. In step 14, the output of the algorithm results in a determination of whether each pixel in the analysed scene is foreground or background. The resulting discrimination between foreground and background is more accurate overall than if any of the underlying detection techniques were used individually. Referring to FIG. 2, each pixel 20 of the captured scene 22 is analysed by a processor 24 according to the steps of FIG. 1, and is determined to be either foreground 26 or background 28.

C. Exemplary Processes

Figure 3:
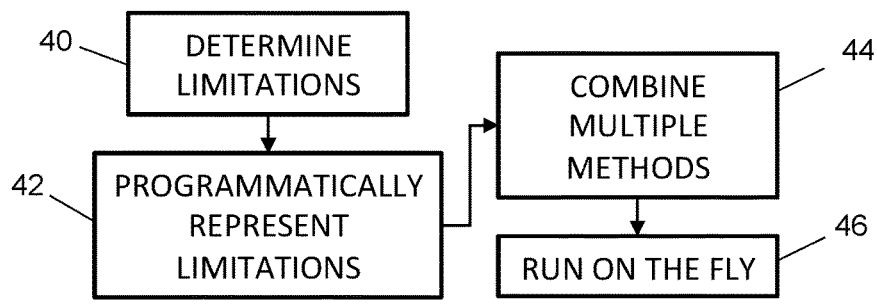
FIG. 3 is a flowchart of a process according to an embodiment of the present invention.

Referring to FIG. 3, a process for segmentation of the pixels of a scene into background and foreground is shown in more detail. In step 40, the failings, or limitations, of each of the individual detection techniques are determined. Each detection technique has its own set of limitations.

In step 42, the limitations of each detection technique are programmatically represented in the multi-modal algorithm in terms of a weighting and generally also a confidence metric. The weighting represents either an overall weight with which the results of a particular detection technique should be relied upon, or a per-pixel weighting that may depend on one or more features of the scene being analyzed. The confidence metric is a value that varies from 0 to 1, for example, and represents the confidence that the technique has correctly judged a given pixel's segment, i.e. segmented into either background or foreground. For example, in chromakeying, the confidence could be 1 for pixels that are detected to be the central color and brightness of the greenscreen, and also 1 for pixels that have a color and intensity significantly different from the central color and brightness of the greenscreen. In the former case, the pixels would be determined to be background, and in the latter case the pixels would be determined to be foreground. However, for pixels that have a color different from, but very close to the color of the greenscreen, the confidence level would be lower, indicating that the system cannot be certain that the pixels are foreground from this technique.

In step 44, the multiple methods are combined using the multi-modal algorithm, according to the different weightings and confidence metrics given to each technique. Step 46 shows that the combination of the results of the detection techniques is performed on the fly, in real-time.

Figure 4:
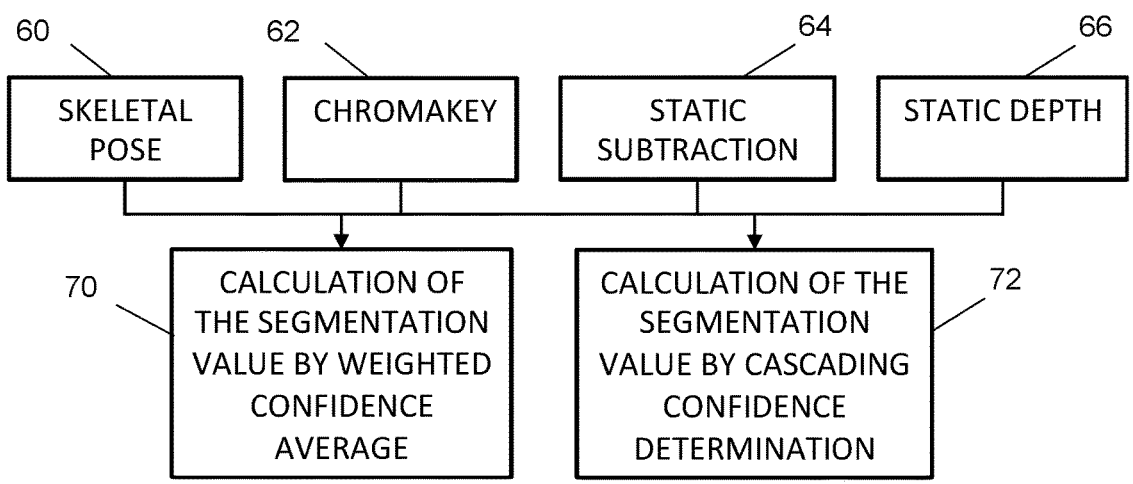
FIG. 4 is a flowchart of the main steps in the multi-modal algorithm, according to an embodiment of the present invention.

Referring to FIG. 4, four example detection techniques (methods) are shown, including skeletal pose detection 60, chromakeying 62, static subtraction 64 and static depth comparison 66.

Each of the techniques provides a segmentation value (0, corresponding to background; or 1, corresponding to foreground) and a confidence value (0-1) for each pixel. The outputs from all of these techniques are fed into one of two different multi-modal algorithms. The first multi-modal algorithm 70 uses a weighted confidence average to determine the segmentation of each pixel in the scene. The second multi-modal algorithm 72 uses a cascading confidence calculation to determine the segmentation of each pixel in the scene. One or both of these algorithms may be employed, depending on the embodiment.

The weighted confidence average 70 is a calculation that aggregates multiple values together without any intrinsic or extrinsic ordering, factoring in both a confidence judgment for each value as well as a manually-tunable user weighting.

For example, when there are two methods (1, 2) of background detection yielding values $y_1$ and $y_2$ for a given pixel, with confidence values $c_1$ and $c_2$ and weighting $w_1$ and $w_2$ at the particular pixel, the calculation to determine the aggregated segmentation value y for the given pixel is:

$$y=(w_1c_1y_1+w_2c_2y_2)(w_1c_1+w_2c_2) \quad \text{(Equation 1)}$$

The resulting, raw value of y is likely to be a value somewhere between 1, which signifies foreground, and 0, which signifies background. An intermediate value indicates that the pixel contains a blend of foreground and background elements, or that the detection techniques are providing differing results for the same situation. A threshold is selected, such as 0.5, so that all values of y above the threshold represent foreground pixels and all values of y equal to or below the threshold are background. The same calculation is done for each pixel. Example values are given in TABLE 1.

TABLE 1

| $w_1$ | 0.6 | 0.6 | 0.9 | 0.2 |
|---|---|---|---|---|
| $c_1$ | 1 | 0.3 | 0.3 | 0.3 |
| $y_1$ | 0 | 0 | 0 | 0 |
| $w_2$ | 0.4 | 0.4 | 0.1 | 0.8 |
| $c_2$ | 1 | 1 | 1 | 1 |
| $y_2$ | 1 | 1 | 1 | 1 |
| y | 0.4 | 0.69 | 0.27 | 0.93 |

When there are n methods of background detection the calculation is generalized to:

$$y = \frac{\sum_{i=1}^{n} w_i c_i y_i}{\sum_{i=1}^{n} w_i c_i} \quad \text{(Equation 2)}$$

Again, the calculation is done for each pixel. The weighted confidence average method includes a developer-specified or user-specified overall weighting for each technique.

Figure 5:
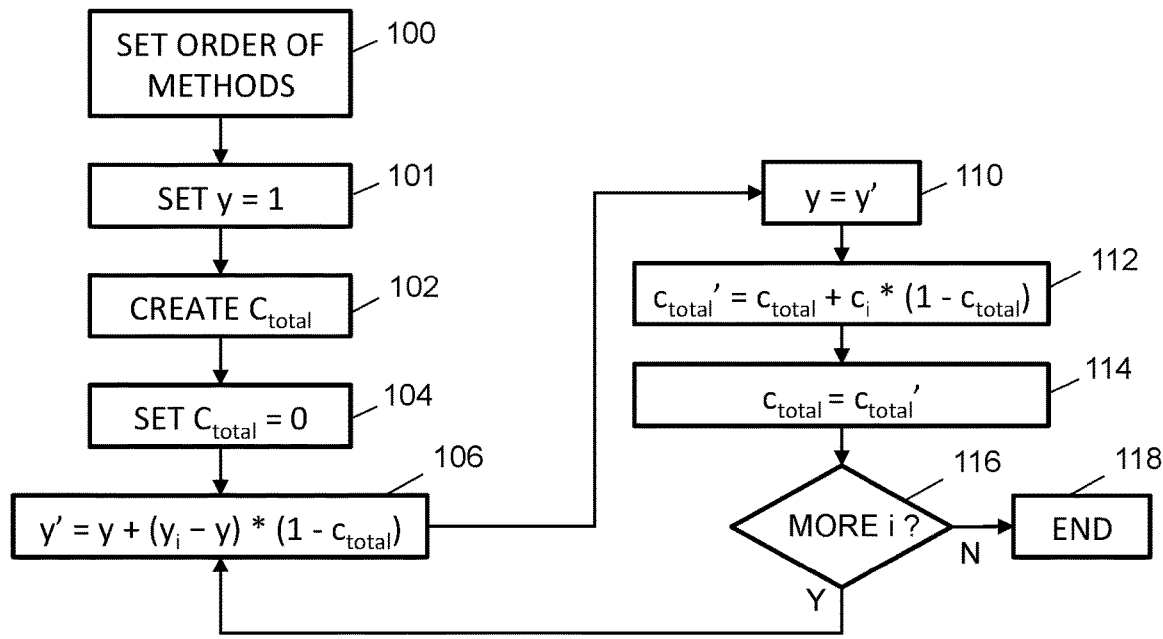
FIG. 5 is a flowchart of a multi-modal algorithm, according to an embodiment of the present invention.

The cascading confidence determination is shown in FIG. 5. This is a calculation that aggregates multiple segmentation values together with a specific ordering to the values, factoring in a confidence judgment for each value. In step 100, the ordering of the different detection techniques is first determined and set by the user of the system.

When there are two methods (1, 2) of background detection yielding values $y_1$ and $y_2$ for a given pixel, with confidence values $c_1$ and $c_2$, the calculation to determine the aggregated segmentation value y for each pixel proceeds as follows. In step 101, the value of y is initialized to 1, i.e. the working value of the given pixel is set to foreground. In step 102 an aggregate confidence variable $c_{total}$ for the pixel is created and in step 104 the working value of it is initialized to 0, i.e. there is initially no confident data. The results from different detection methods are then run through in order to modify the segmentation value y for the pixel. The value $(1-c_{total})$ is the amount of non-confidence remaining for the pixel as the calculation progresses. This represents the amount that the current detection technique and potentially subsequent techniques can affect the final output. In step 106, the value y for the pixel is now modified via the calculation:

$$y'=y+(y_i-y)*(1-c_{total}) \quad \text{(Equation 3)}$$

The effect of Equation 3 is to blend the current aggregate value of y with the value $y_i$ of the results of the particular method of detection now being applied, modulated by the amount $(1-c_{total})$ that the method is able to affect the aggregate value.

If $c_{total}=1$, this indicates that a previous method was fully confident in its segmentation value judgment, and it leaves subsequent methods with no ability to affect the result. Conversely, if $c_{total}=0$, then prior methods, if any, provided no confident data and the current method's value of $y_i$ will become the working aggregate value.

In step 110, the aggregate value of y is set to the value of y'. In step 112, the value $c_{total}$ is now modified through the calculation:

$$c_{total}'=c_{total}+c_i*(1-c_{total}) \quad \text{(Equation 4)}$$

and then $c_{total}$ is set to the value of $c_{total}'$ in step 114. The effect of this step is to add the confidence that this method produced, modulated by the amount it affected the aggregated value.

In step 116, the system determines whether there are any more detection methods to be taken account of, and if so, the process reverts to step 106 with the value of i incremented by 1. If there are no more detection methods to be taken into consideration, then the process for the particular pixel in question ends in step 118. Example results of Equations 3 and 4 are shown in TABLE 2.

TABLE 2

| i | 1 | 2 | 3 |
|---|---|---|---|
| $y_i$ | 1 | 0 | 1 |
| $c_i$ | 0.7 | 0.8 | 0.9 |
| y | 1 | 1 | 0.7 |
| y' | 1 | 0.7 | 0.718 |
| $c_{total}$ | 0 | 0.7 | 0.94 |
| $c_{total}'$ | 0.7 | 0.94 | 0.994 |

The whole process is performed in parallel for all of the pixels in an image frame. In order to do this, a GPU (graphics processing unit) is used in some embodiments.

There are numerous different techniques that can be incorporated into the process for scene segmentation. Data inputs may include one or more of an optical comparison, a depth comparison, a subject approximation and computer vision.

Optical comparisons include use of a global reference (chromakey), a frame reference and a 3D reconstructed scene reference. For the chromakey reference the color or each pixel is compared to a global, pre-calibrated reference range. If the pixel is within the range, that pixel is considered to be a background pixel. When a frame reference is used, the color is compared on a per-pixel level to a per-pixel pre-calibrated reference range stored in a color texture or "map". If the pixel is within the reference range corresponding to that particular pixel, then it is considered to be a background pixel. Where a 3D scene reference is used, color is compared on a per-pixel level to a reference range calculated by sampling a 3D mesh reconstruction of the background. If the pixel has a color within the range corresponding to that particular pixel, then that pixel is considered to be a background pixel. The 3D mesh sampling is performed by matching the perspective of the real camera at runtime with a virtual camera in the 3D reconstructed scene, and determining the data bound to the virtual surface that exists at the matching view position as the target reference pixel.

A depth comparison may also use one or more of a global reference, a frame reference and a 3D reconstructed scene reference. If a global reference is used, a comparison of the depth is made on a per-pixel level to a global pre-calibrated reference distance. If the pixel is beyond the reference distance, that pixel is considered to be a background pixel.

Where a frame reference is used, a depth comparison is made on a per-pixel level to a per-pixel pre-calibrated reference range stored in a depth texture or "map". If the pixel has a depth that is beyond a specified threshold distance in front of the corresponding reference background pixel, then that pixel is considered to be a background pixel.

Where a 3D scene reference is used, depth is compared on a per-pixel level to a reference distance calculated by sampling a 3D mesh reconstruction of the background. If the distance of the pixel is beyond a certain tolerance in front of the reference pixel, that pixel is considered to be a background pixel. The 3D mesh sampling is done by matching the perspective of the real camera at runtime with a virtual camera in the 3D scene, and determining the distance of the virtual surface that exists at the matching view position as the target reference pixel.

Subject approximation methods may include a tracked device envelope or, for VR users, skeletal simulation. Using a tracked device envelope, a crop box or envelope is drawn around one or more tracked devices in the foreground. Any pixels that are outside the envelope are considered to be background pixels. Tracked devices with inverse kinematics may use the 6DOF (six degrees of freedom) data from any available tracked devices such as a headset, controllers, and trackers worn by a user. The 6DOF data is used to drive a 3D skeletal simulation of the user. The current simulated state or pose of the skeleton is referenced to discard pixels outside a buffer zone surrounding the user as background pixels. A depth map analysis can be used to feed a depth map into a computer vision process, which returns an approximate state of the user's skeleton. The current state of the skeleton is then used to determine that pixels outside an approximate area containing the user are background pixels.

Computer vision techniques include semantic detection and continuity detection. When using semantic detection, a list of object types that are classified as the subject (humans, clothes, etc.), as well as optical and/or depth data are fed into a computer vision process, which then returns a texture or "map" of which pixels are recognized as belonging to those types. Subject pixels are classified as foreground and other pixels are classified as background.

Continuity detection involves feeding positions of tracked devices on the subject and optical and/or depth data into a computer vision process, which then returns a texture or "map" of which pixels are recognized to be connected physically to the devices. The pixels that are connected to the devices are considered to be foreground pixels and the pixels that are not connected to the devices are considered to be background pixels.

Figure 6:
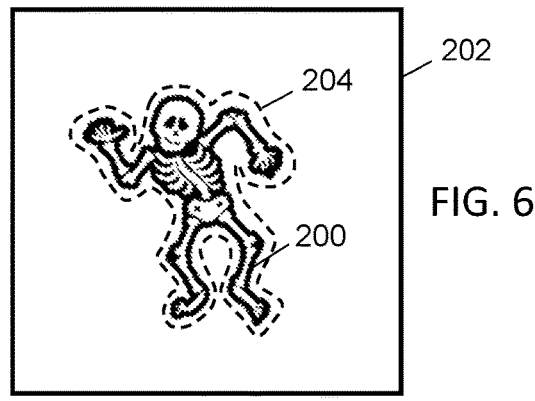
FIG. 6 is a schematic diagram showing a skeletal pose envelope used in embodiment of the present invention.

Referring to FIG. 6, the use of a skeletal pose 200 in an image frame 202 is shown. When the subject is a person, for example, the subject, or foreground is detected as a skeletal pose 200. Any pixels coinciding with the skeleton are considered to be foreground pixels with a confidence value of 1. Any pixels outside of a boundary 204 are considered to be background with a confidence value of 1. Pixels that lie between the skeleton 200 and the boundary 204, i.e. the pixels that lie in an intervening buffer zone, are considered to be foreground with a confidence value that varies from 0 at the boundary to 1 at the skeleton.

Figure 7:
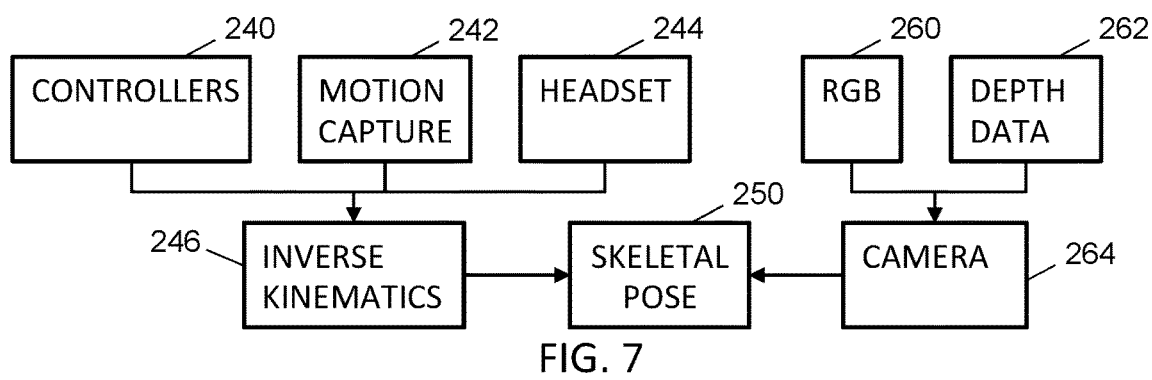
FIG. 7 is a flowchart showing the steps to determine a skeletal pose, according to an embodiment of the present invention.

Referring to FIG. 7, there are several different techniques that can be used for detecting the skeletal pose of a subject. For example, position signals from hand-held controllers 240, motion capture signals 242 and positional signals from a headset 244 can all be used in an inverse kinematics calculation 246 to determine the skeletal pose 250 of the subject at the particular moment in time that corresponds to the image frame that is being segmented. Other techniques include the use of RGB information 260 and depth data 262 that are captured by one or more cameras 264 and used for calculation of the skeletal pose 250.

Figure 8:
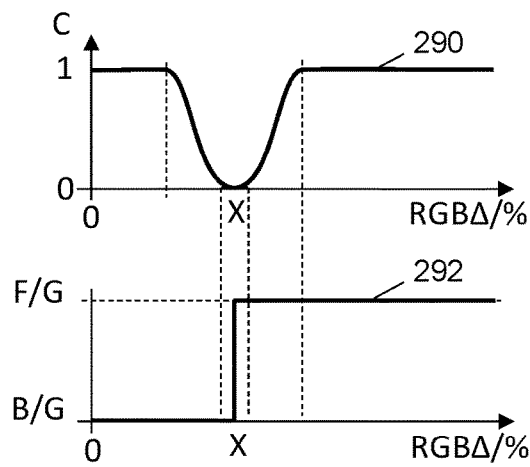
FIG. 8 is a graph of a confidence metric for scene segmentation using a greenscreen, according to an embodiment of the present invention.

Referring to FIG. 8, an example of a greenscreen technique is shown, in which the greenscreen has a color with a given RGB value. For each pixel, the confidence value 290 and segmentation value 292 are shown as functions of the RMS percentage difference Δ of the detected RGB values compared to the greenscreen RGB values. For differences below a threshold X, i.e. for colors that are very close in RGB values to the greenscreen values, the pixel is considered to be background (B/G). For pixels that have RGB values that have a difference greater than X, they are considered to be foreground (F/G). The confidence curve is 1 for detected differences that are small compared to the threshold X, indicating a certainty that the pixel is background. The confidence curve is 0 for differences that are equal to the threshold X, indicating that the detection method cannot determine whether the pixel is foreground or background. The confidence curve is 1 for detected differences that are large compared to the threshold X, indicating a certainty that the pixel is foreground. Between the values of 1 and 0, the confidence value varies.

When background subtraction is used as a detection technique, the same principle can be used as shown in FIG. 8, except that each pixel in the background image has its own particular RGB value with which to compare the corresponding detected image pixel.

Figure 9:
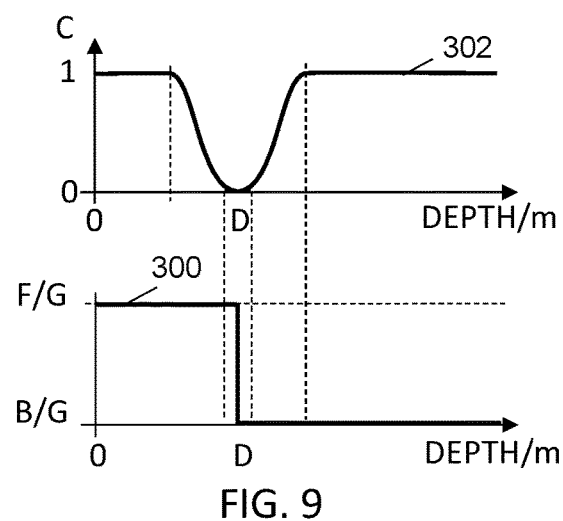
FIG. 9 is a graph of a confidence metric for scene segmentation using depth detection, according to an embodiment of the present invention.

FIG. 9 shows the foreground/background determination curve 300 and confidence level curve 302 for the technique of depth detection. Pixels that are detected as having a depth of D or greater from the camera are considered to be background, and pixels that are closer to the camera than a depth of D are considered to be foreground. When pixels are determined to be close to the threshold depth D, the confidence level falls to represent the uncertainty as to whether the pixel is foreground or background.

Figure 10:
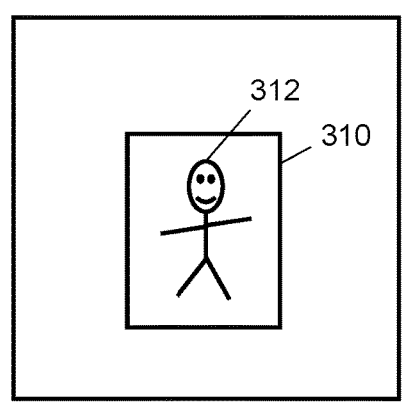
FIG. 10 is a schematic representation of scene segmentation using a crop box, according to an embodiment of the present invention.

Referring to FIG. 10, a further detection technique is shown in which a crop box 310 is drawn around a foreground subject 312. All pixels exterior to the crop box are considered to be background pixels with a confidence level of 1. All pixels within the box are considered to be foreground, with varying levels of confidence.

D. Exemplary System

Figure 11:
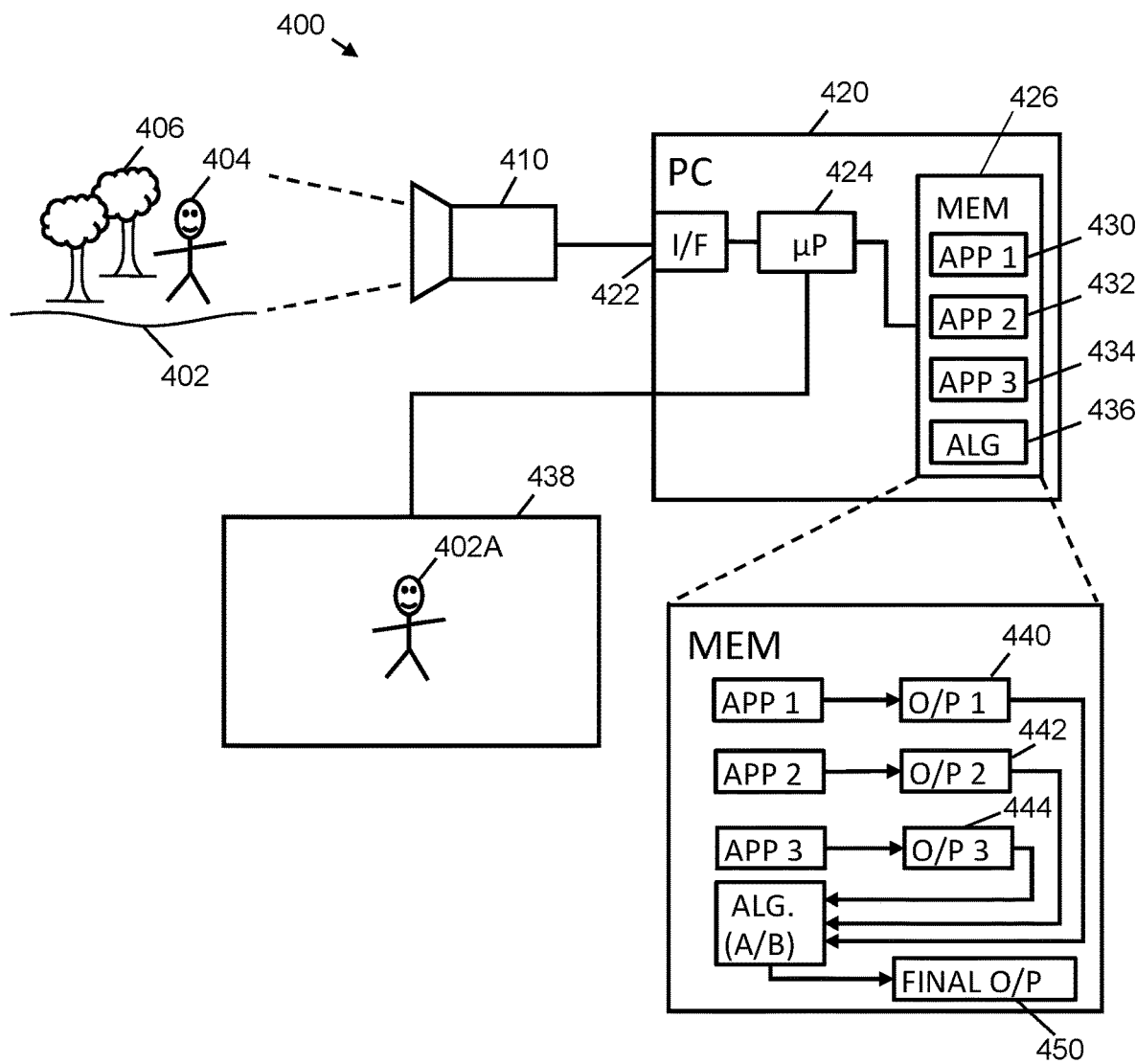
FIG. 11 is a schematic representation of a system for multi-modal scene segmentation, according to an embodiment of the present invention.

Referring to FIG. 11, there is shown an exemplary system 400 for scene segmentation using multi-modal data fusion. The scene 402 includes a foreground subject 404 and a background 406. A camera 410 is positioned to capture the scene 402 and is connected to a computer 420 via an interface 422. The computer 420 may be a desktop, laptop or tablet computer, for example, or any other electronic device that provides the necessary equivalent functionality to fulfill the requirements of the invention. The computer 420 includes one or more processors 424 which are operably connected to computer readable memory 426 included in the computer. The system 400 includes computer readable instructions, e.g. applications 430, 432, 434, 436 stored in the memory 426. Applications 430, 432, 434 each perform different analyses corresponding to different segmentation techniques, such as chromakeying, depth detection and skeletal pose detection. Application 436 is the multi-modal data fusion algorithm for combining the outputs of the individual detection techniques as provided by the applications 430, 432, 434. The processor 424 optionally provides an output on screen 438, which includes only the foreground segment 102A of the captured image and not the background 406.

An expanded view of the memory 426 shows that the output 440 from the application 430, the output 442 from the application 432 and the output 444 from the application 434 are all passed to the multi-modal algorithm application 436. The final output 450 from the multi-modal algorithm application 436 is used for compositing the foreground portion of the image onto another background.

D. Variations

While the present embodiment describes the best presently contemplated mode of carrying out the subject matter disclosed and claimed herein, other embodiments are possible.

Additional processes can create and modify calibration data on-the-fly through sensor fusion. For example, optical comparison can be combined with a "rolling" frame of reference, which is updated per pixel if that pixel is detected as a background pixel through another segmentation method, such as depth comparison with a pre-calibrated frame of reference.

In some embodiments, human subject reconstruction may be implemented by creating a 3D model of the subject, including textures of the subject. A depth camera may be used to determine the 3D model size and textures. In other cases, photogrammetry may be used to determine the 3D model size and textures. The depth data may be used to estimate subject size and pick a pre-made model as a "best match".

The curves representing confidence levels in FIGS. 8 and 9 are examples only and are different in other embodiments.

Confidence levels may be different for different types of scene, lighting or background, and may vary depending on the amount of motion in the foreground or background. Confidence levels may vary depending on the properties of the foreground, e.g. whether it includes netting or hair, certain material patterns or more uniform colors.

Machine learning may be incorporated in some embodiments to change the confidence levels of the various methods of detection, and/or to compensate for noise introduced by the detection methods. Comparisons between successive frames may be used by machine learning techniques to better determine which pixels are foreground and which are background.

In some embodiments, a pixel is determined to be foreground only if the analysis of both the current frame and the immediately preceding frame dictate that the pixel is foreground. The effect of this is to eliminate noise that may cause random background pixels to be incorrectly determined as foreground.

One or more cameras on drones may be used to capture the subject and background. Stereoscopic cameras may be used for depth determination. HSB values may be used instead of RGB values. Lidar may be used for depth determination.

Background scenes may be captured in advance of the videoing of a subject, and 3D models made of the background scenes. In particular, this applies to outdoor backgrounds.

Specific rules may be implemented that affect the confidence levels for each technique. For example, a building may be in the background of the scene, but it may have variable distances from the camera if it is not square on to the camera. A depth camera may detect that only part of the building is in the background. An RGB camera may detect that the color of the building extends into another portion of the image that has not been determined to be background. A rule may be created to say that colors or patterns, which are clearly in the background and extend contiguously into what would be a foreground distance, should be determined to be background pixels.

Computer readable instructions may be broken down into blocks of code or modules. The memory 426 may be divided into one or more constituent memories, of the same or different types.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Steps in the flowcharts may be performed in a different order, other steps may be added, or one or more may be removed without altering the main function of the system. Flowcharts from different figures may be combined in different ways. All parameters and configurations described herein are examples only and actual values of such depend on the specific embodiment. Accordingly, the scope of the invention is to be construed in accordance with the substance defined by the following claims.

The invention claimed is:

1. A method for segmenting an image into foreground and background comprising the steps of:

capturing an image of a scene;
for each of multiple detection techniques, processing the image to preliminarily determine that each pixel in the image is either background or foreground;
defining an order in which the preliminary determinations of the detection techniques are to be combined;
for each pixel, combining the preliminary determinations in the order in a cascading confidence determination in proportion to a confidence level attributed to each detection technique to yield a blended value for each pixel, wherein the blended value lies in a range varying from a value that represents background to a value that represents foreground;
wherein the cascading confidence determination comprises, for each pixel:
initializing a working value y of the blended value to be equal to 1;
initializing a working value $c_{total}$ of an aggregate confidence value to be equal to 0;
for each detection technique numbered i, in said order:
modifying y to equal $y+(y_i-y)*(1-c_{total})$, wherein $y_i$ is the preliminary determination from the detection technique numbered i; and
modifying $c_{total}$ to equal $c_{total}+c_i*(1-c_{total})$, wherein $c_i$ is the confidence level attributed to the detection technique numbered i; and
setting the blended value equal to y after all said modifying steps;
defining a threshold value that lies in the range; and
for each pixel, determining that the pixel is foreground or background depending on which side of the threshold the blended value lies.

2. The method of claim 1, wherein the value that represents background is 0 and the value that represents foreground is 1.

3. The method of claim 1, wherein the multiple detection techniques include two or more of:
skeletal pose determination;
chromakeying;
static subtraction;
global depth comparison;
depth map comparison;
reference to a 3D model of a background in the scene;
a tracked device envelope;
object recognition with computer vision; and
continuity detection.

4. The method of claim 1, wherein the preliminary determinations are combined in proportion to a weighting factor corresponding to each detection technique.

5. The method of claim 4, wherein the weighting factors and confidence levels are specific to each pixel.

6. The method of claim 1, performed in real-time.

7. The method of claim 1, further comprising removing the background pixels from the image.

8. The method of claim 7, further comprising compositing the image with the background pixels removed onto a further image.

9. The method of claim 1, wherein the image is one of multiple frames in a video.

10. The method of claim 9, wherein a determination that a pixel is foreground is changed to a determination that the pixel is background if the pixel has not been determined as foreground in an immediately preceding frame.

11. The method of claim 1, wherein the image is captured by a camera on a drone.

12. A system for segmenting an image into foreground and background comprising:
a camera configured to capture an image of a scene; and
a processor connected to the camera and configured to:
receive the image from the camera;
for each of multiple detection techniques, process the image to preliminarily determine that each pixel in the image is either background or foreground;
define an order in which the preliminary determinations of the detection techniques are to be combined;
for each pixel, combine the preliminary determinations in the order in a cascading confidence determination in proportion to a confidence level attributed to each detection technique to yield a blended value for each pixel, wherein the blended value lies in a range varying from a value that represents background to a value that represents foreground;
wherein the cascading confidence determination comprises, for each pixel:
initializing a working value y of the blended value to be equal to 1;
initializing a working value $c_{total}$ of an aggregate confidence value to be equal to 0;
for each detection technique numbered i, in said order:
modifying y to equal $y+(y_i-y)*(1-c_{total})$, wherein $y_i$ is the preliminary determination from the detection technique numbered i; and
modifying $c_{total}$ to equal $c_{total}+c_i*(1-c_{total})$, wherein $c_i$ is the confidence level attributed to the detection technique numbered i; and
setting the blended value equal to y after all said modifying steps;
define a threshold value that lies in the range; and
for each pixel, determine that the pixel is foreground or background depending on which side of the threshold the blended value lies.

13. The system of claim 12, wherein the processor determines that the pixels are foreground or background in real-time.

14. The system of claim 12, wherein the processor is further configured to remove the background pixels from the image.

15. The system of claim 14, wherein the processor is further configured to composite the image with the background pixels removed onto a further image.

16. The system of claim 12, wherein the camera is on a drone.

* * * * *